(12) United States Patent
Furman

(10) Patent No.: US 9,808,880 B2
(45) Date of Patent: Nov. 7, 2017

(54) REMOTE SENSE LEAD MAGNITUDE AND POLARITY CONTROLLER

(71) Applicant: Lincoln Global, Inc., City of Industry, CA (US)

(72) Inventor: Edward Michael Furman, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 195 days.

(21) Appl. No.: 14/518,272

(22) Filed: Oct. 20, 2014

(65) Prior Publication Data

US 2015/0034619 A1 Feb. 5, 2015

Related U.S. Application Data

(62) Division of application No. 11/550,120, filed on Oct. 17, 2006, now Pat. No. 8,969,763.

(51) Int. Cl.
| | |
|---|---|
| *B23K 9/10* | (2006.01) |
| *B23K 9/12* | (2006.01) |
| *B23K 9/32* | (2006.01) |
| *B23K 9/095* | (2006.01) |

(52) U.S. Cl.
CPC .............. *B23K 9/10* (2013.01); *B23K 9/0953* (2013.01); *B23K 9/124* (2013.01); *B23K 9/32* (2013.01)

(58) Field of Classification Search
CPC .................................. B23K 9/10; B23K 9/095
USPC ... 219/130.21, 130.31, 130.1, 130.5, 137 PS
See application file for complete search history.

(56) References Cited

U.S. PATENT DOCUMENTS

| | | | |
|---|---|---|---|
| 3,603,846 A | 9/1971 | Toth | |
| 4,247,751 A * | 1/1981 | Ashton | B23K 9/125 219/130.31 |
| 4,459,456 A | 7/1984 | Jurek et al. | |
| 4,493,040 A | 1/1985 | Vanderhelst | |
| 5,196,668 A | 3/1993 | Kobayashi et al. | |
| 5,278,390 A * | 1/1994 | Blankenship | B23K 9/0953 219/125.1 |
| 5,508,497 A * | 4/1996 | Fabianowski | C21C 5/5229 219/662 |
| 6,066,832 A | 5/2000 | Uecker et al. | |
| 6,384,373 B1 * | 5/2002 | Schwartz | B23K 9/1043 219/130.1 |
| 6,479,791 B1 | 11/2002 | Kowaleski et al. | |
| 6,570,130 B1 * | 5/2003 | Kooken | B23K 9/1006 219/130.01 |
| 7,151,242 B2 * | 12/2006 | Schuler | F24C 7/087 219/620 |

(Continued)

*Primary Examiner* — Quang D Thanh
*Assistant Examiner* — Ayub Maye

(57) ABSTRACT

In a welding power supply, a feedback circuit senses electrical signals from the power output studs and from remote welding sense leads. The feedback control circuit scales the electrical signals and converts the signals to binary numbers having magnitude bits and a polarity bit respectively. The binary numbers, representing the signals, are simultaneously shifted into a logic processor for calculation of a feedback signal based on the digitized input. The feedback signal is calculated based on the polarity of connectivity of the remote welding sense leads as represented by the binary numbers. The feedback signal is then fed into the power supply output controller for automatically adjusting the power output of the arc welder.

8 Claims, 8 Drawing Sheets

(56) References Cited

U.S. PATENT DOCUMENTS

| | | | | |
|---|---|---|---|---|
| 8,269,141 B2 * | 9/2012 | Daniel | ............... | B23K 9/1006 |
| | | | | 219/130.1 |
| 8,581,147 B2 * | 11/2013 | Kooken | ............... | B23K 9/095 |
| | | | | 219/130.1 |
| 2005/0051720 A1 * | 3/2005 | Knecht | ............... | H01J 49/0009 |
| | | | | 250/288 |
| 2006/0247795 A1 * | 11/2006 | Gass | ............... | B23D 59/001 |
| | | | | 700/1 |

* cited by examiner

| LOGIC INPUTS | | | | LOGIC OUTPUT |
|---|---|---|---|---|
| DIN 0 | DIN 1 | DIN 4 | DIN 5 | TERM 1 - TERM 2 |
| 0 | 1 | 0 | 0 | DIN 1 - DIN 3 |
| 1 | 0 | 0 | 0 | DIN 2 - DIN 0 |
| 0 | 1 | 1 | 0 | DIN 0 - DIN 4 |
| 1 | 0 | 0 | 1 | DIN 5 - DIN 0 |
| 0 | 0 | 0 | 1 | DIN 5 - DIN 3 |
| 0 | 0 | 1 | 0 | DIN 2 - DIN 4 |
| 0 | 0 | 0 | 0 | DIN 2 - DIN 3 |

FIG. 7

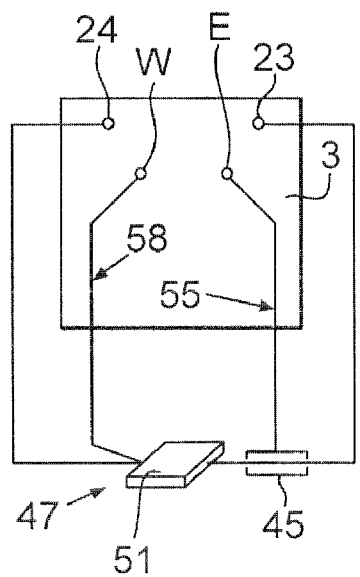
FIG. 8.1
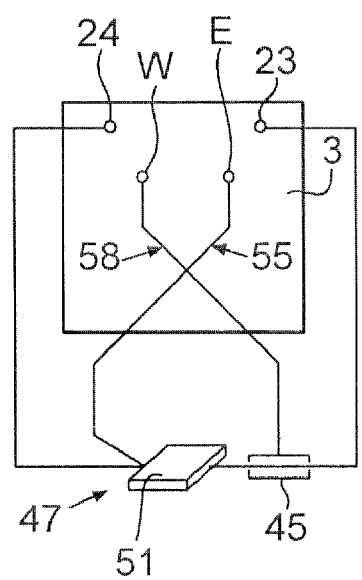
FIG. 8.2

Detecting electrical signals from sense leads used with a welding power supply

Conditioning the signals received from the sense leads by segmenting the signals into components Rectifying the components of the signals Digitizing the components of the signals for communication to a logic processor Generating a feedback signal responsive to the polarity connection of sense leads

FIG. 9

REMOTE SENSE LEAD MAGNITUDE AND POLARITY CONTROLLER

CROSS-REFERENCE TO RELATED APPLICATIONS

This application is a divisional of, and fully incorporates by reference, U.S. patent application Ser. No. 11/550,120 filed on 17 Oct. 2006.

TECHNICAL FIELD

The present invention pertains to control systems for welding power supplies having welding cables and remote sense leads, and more particularly to control systems that detect polarity of the remote sense leads and adjust the feedback based upon the polarity detected.

BACKGROUND OF THE INVENTION

Electric arc welding technology utilizes a power source that passes electrical current between an electrode and a work piece. Typically, the electrode includes welding wire drawn from a drum or reel of welding wire and passed through a contact tip for depositing the welding wire onto the work piece. The power source of the welder typically includes a first stud connected to the electrode and a second stud connected to the work piece. Connections are made via welding cables, which may be quite long possessing a variety of impedance variables, such as inductive reactance based upon length, position and shape of the cables. During the welding process, the power supply receives a command signal to create a particular output signal between the electrode and work piece, which may be a pulse wave. One of the more common power sources is the Power Wave sold by The Lincoln Electric Company of Cleveland, Ohio. The welder must accurately control the output signal, e.g. a constant voltage output or a pulse shape waveform, by controlling the voltage, which may vary during the welding procedure. To ensure the desired welding operation between the electrode and work piece, the output signal or command signal is created based upon feedback from the actual welding operation. This feedback involves the arc current and/or the arc voltage. However, the arc voltage between the electrode and work piece cannot be determined by the voltage between the output studs of the power source. Voltage is affected by not only the impedance of the cables, but also the choke and other impedance creating components in the welding operation. To ensure an accurate feedback of the voltage, voltage sensing leads are interconnected between the controller of the power source to the electrode and the work piece. The voltage from the voltage sensing leads determines the command signal to the power source from the controller. Accordingly, negative results affecting the quality of the weld can occur if the voltage sense leads become disconnected from the welding circuit. Since the voltage command to the power source is determined by the voltage feedback signal, a misconnected or disconnected sense lead will provide a feedback signal indicating a faulty change in the arc voltage.

Typically installation of the sense leads requires the operator to open his equipment and configure the power source for the type and polarity of sense leads that he will be using. Dip switches tell the power source what sense leads are connected and with what polarity. If the sense leads are incorrectly configured or installed, weld quality will suffer and in many situations the work piece may be rendered unusable. Material costs, production downtime and set up of the new components can accumulate to considerable losses. In certain instances, the sense leads may also break or otherwise become disconnected from the electrode or work piece. Burn back will likely result causing loss of the welding tip and potential rework of the work piece. It would therefore be advantageous to reduce set up time and lost production costs by using a power source that automatically detects the sense lead configuration and automatically adjusts the feedback accordingly.

SUMMARY OF THE INVENTION

The embodiments of the present invention obviate the shortcomings of the prior art welding power supplies. In accordance with one embodiment, a feedback signal generating device is incorporated for use with a welding power supply. The welding power supply includes opposite polarity power output terminals, i.e. positive and negative, to which welding cables are detachably connected for conveying welding current during the welding process. The welding cables include an electrode and a work piece cable. First and second opposite polarity sense leads are connected to the electrode and the work piece for communicating first and second sense lead signals representing electrical parameters, which may be voltage, as detected at the welding work site. The device includes a signal conditioning circuit in electrical communication with the sense leads that receive the first and second sense lead signals, which segment the signals in one or more signal components for determining the polarity of the sense leads. A logic processor is electrically communicated to receive signals from the signal conditioning circuit for calculating a weld supply feedback signal that is generated responsive to the polarity of the first and second sense leads. The logic processor interrogates the weld power supply with the feedback signal.

The signal conditioning circuit includes a first input for receiving the first sense lead signal and a second input for receiving the second sense lead signal, where the signal conditioning circuit includes a scaling circuit that may comprise resistance divider network for conditioning the first and second sense lead signals. The divider network may be connected between the first and second inputs and a reference or base signal. The first and second sense lead signals may be voltage signals as detected by the remote welding sense leads at the worksite. Accordingly, the reference signal may be a predetermined voltage set for use with the embodiments of the subject invention. The reference voltage may be in the range of 0-9 volts.

The signal conditioning circuit may include a voltage divider network utilizing resistors and having at least a first node. The first and second sense lead signals may be conditioned or scaled by the voltage divider network and subsequently communicated to the logic processor.

The logic processor may incorporate digital logic circuitry for use in calculating the feedback signal. The circuitry may be hard-wired or dedicated circuitry configured specifically to generate the feed back signal responsive to the input signals from the first and second sense leads. The logic processor may incorporate Boolean logic to process the conditioned input signals. Specifically, the logic processor may utilize a field programmable gate array capable of sequencing through logic table for the purpose deriving a feedback signal.

A method of the controlling the welding power supply includes sensing the polarity of the remote welding sense leads through a feedback sensing circuit that detects the magnitude and polarity of the electrical welding parameters at the work site where the polarity may then be compared to a reference signal and calculating a feedback control signal based upon the sensed polarity of the remote welding sense leads. The feedback signal may then be communicated to the welding power supply thereby automatically adjusting the power supply output in response thereto.

In another embodiment, a method of calculating a feedback includes providing a signal conditioning circuit and a logic processor electrically communicated to the signal conditioning circuit, detecting at least a first sense lead signal from the associated sense leads, segmenting the at least a first sense lead signal into one or more signal components, determining the polarity connection of the sense leads responsive to the magnitude of one or more signal components and calculating a feedback control signal responsive to the polarity connection of the sense leads.

One aspect of the method of the embodiments of the subject invention includes scaling a sense lead signals and segmenting the sense lead signals into one or more rectified and/or inverted signal components. The signal components may then be digitally converted and subsequently shifted into the logic processor in a synchronized manner via a clock signal.

The signals being detected or sensed may be voltage signals from the welding work site. First and second voltage signals may be detected by the remote welding sense leads. Additionally, voltage signals may be detected at the power output terminals of the power supply. All of the detected signals may be scaled with respect to a common reference signals. After having been scaled, each of the signals may then be digitally converted and simultaneously shifted into the logic processor for populating a logic table that can be used to select a Boolean logic function for calculating a feedback signal. The logic processor may compare the signals to determine if there is a welding short or if the remote welding sense leads have become detached.

BRIEF DESCRIPTION OF THE DRAWINGS

FIG. 7 is a table showing the logical outputs of the logic processor according to the embodiments of the subject invention;

FIG. 8.1 is a schematic representation of a welder showing one configuration of connecting the remote sense leads according to the embodiments of the subject invention;

FIG. 8.2 is a schematic representation of a welder showing another configuration of connecting the remote sense leads according to the embodiments of the subject invention; and FIG. 9 is a flow chart of the methods of calculating a feedback signal responsive to the polarity connection of the remote sense leads according to the embodiments of the subject invention.

DETAILED DESCRIPTION OF THE INVENTION

Figure 1:
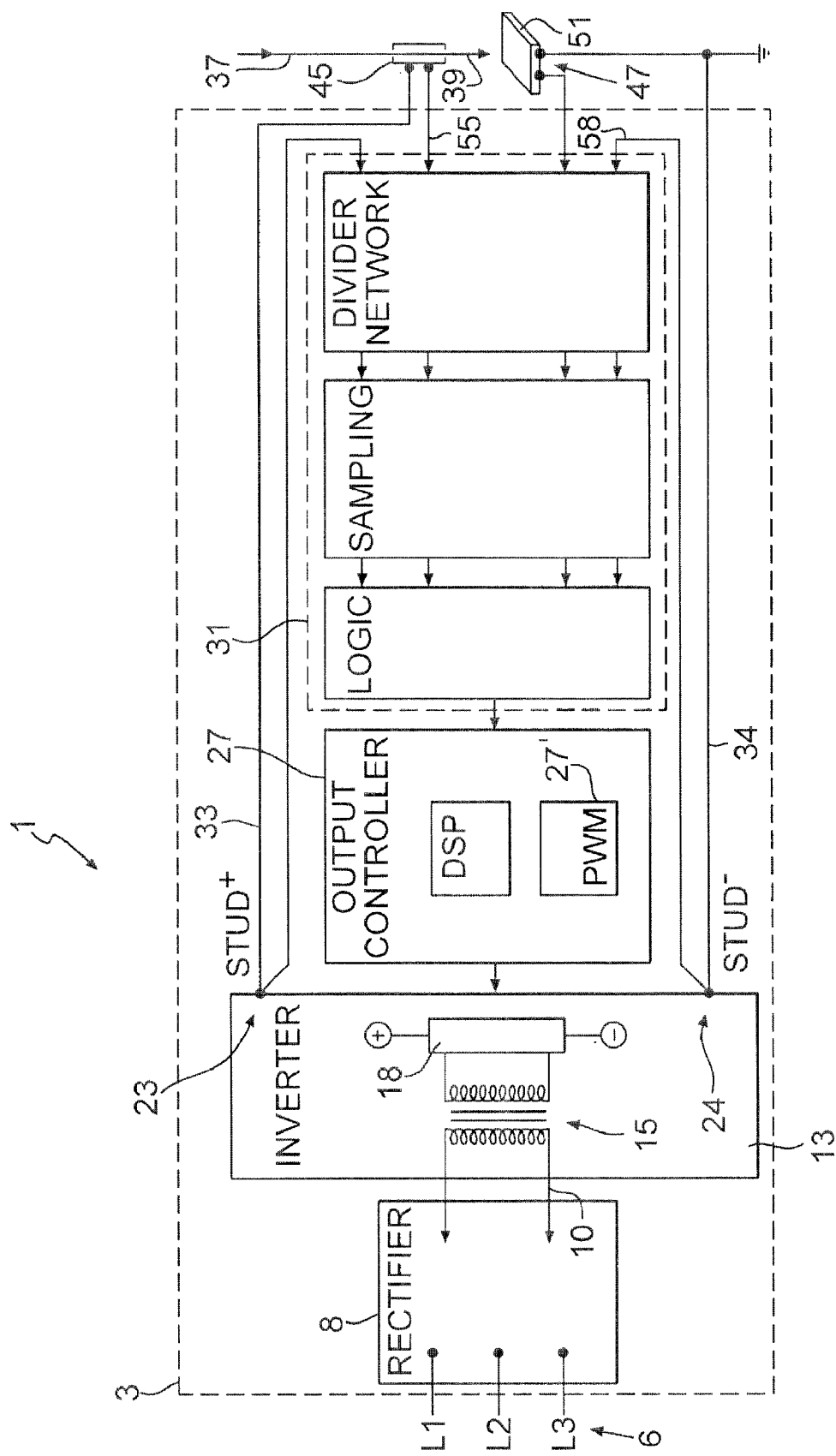
FIG. 1 is a block diagram and schematic representation of a welding power supply and remote sense leads incorporating the embodiments of the subject invention.

Referring now to the drawings wherein the showings are for purposes of illustrating embodiments of the invention only and not for purposes of limiting the same, FIG. 1 shows a welder depicted generally at 1. The welder 1 includes a power source 3 or power supply 3 shown in dashed lines. The power source 3 described hereafter is exemplary in nature. As such, persons of ordinary skill in the art will readily understand the application of the embodiments of the subject invention to welding power supplies including both DC and AC output power. The power source 3 is illustrative as a high switching speed inverter, such as the Power Wave manufactured by The Lincoln Electric Company in Cleveland, Ohio. In the current embodiment, three phase power 6, shown by input power lines L1, L2 and L3, is directed to a power source rectifier 8 that produces a DC signal through conductors 10, of which the DC signal may be further directed to the input of an inverter 13. The inverter 13 includes a transformer 15 having primary and secondary windings in a manner well known in the art. Output from the secondary windings may be directed to rectifier 18 providing positive and negative supply power to power output terminals 23, 24, respectively, also referred to as studs 23, 24. The power source 3 may further include a power output controller 27 electrically communicated to the rectifier 18 for gauging or controlling output power at the studs 23, 24 during the welding process. In one embodiment, the controller 27 may include a pulse wave modulator 27' or PWM 27'. Welding cables 33, 34 may be connected to the power supply 3, and more specifically to the studs 23, 24, for delivering welding current to a work piece 51 through an electrode 45 and work piece connector 47. Typically, the welding cables 33, 34 are long having inherent impedance characteristics as mentioned above. An electrode 45 may include welding wire 37 supplied from a continuous source, such as a wire feeder, not shown, through contact tip 39 to which positive welding cable 33 is electrically connected. Similarly, welding cable 34 may include a work piece connector 47 for electrically connecting the welding cable 34 and the work piece 51.

With continued reference to FIG. 1, the controller 27 may also include a waveform generator or other digital signal processor (DSP) 28 in accordance with standard welding technology. The controller 27 may be used to control the power output between the electrode 45 and the work piece connector 47. Welding is initiated by engaging the pulse width modulator 27' according to a command signal or output enable signal and a feedback signal via remote welding sense leads 55, 58. As such, the controller 27 may utilize the feedback signal to adjust power output at the studs for maintaining a high quality weld. The remote welding sense leads 55, 58 may be electrically connected between the power source 3 and the electrode 45 and the work piece 51 respectively to direct feedback signals representative of the operating parameters at the welding site. In this manner, feedback signals from the sense leads 55, 58 may be combined with the command signal in the digital signal processor 28 to adjust the power output as needed. Each of the remote welding sense leads 55, 58 may be connected to one of either of the electrode 45 or the work piece 47. More particularly, the remote welding sense leads 55, 58 may be interchangeably connected to the electrode or the work piece without configuring the power supply 3 and without adversely affecting the power output as managed by the controller 27. As will be described in detail below, a feedback conditioning circuit 31 may be incorporated to receive the signals generated through the sense leads 55, 58 and derive a feedback signal that may be used by the controller 27 to adjust the power output supply while compensating for any configuration of sense lead 55, 58 connections including misconnected and broken or severed sense lead wires. Thus, the embodiments of the invention may relate to a feedback controller that automatically adjusts the feedback signal for any connection of sense leads without configuring the power supply 3.

In preparation for the welding process, the operator may connect the sense leads 55, 58 at first ends to respective sense lead connectors located on the welding supply and at second ends respectively to the electrode 45 and the work piece 47. Prior to the advent of the embodiments of the subject invention, the operator had to configure the power supply according to the connection and type of the sense leads used. Prior art power sources may be configured, in one manner, by setting the order of a specific set of switches that signal the controller to process input from the sense leads in a prescribed manner. However, misconnection of those sense leads with respect to the switch settings resulted in poor weld quality and in certain circumstances irreparable damage to the work piece. In contrast, the embodiments of the present invention sense the connection configuration of the sense leads 55, 58 and automatically adjust the feedback signal used by the controller 27 responsive to the connection of the sense leads via the feedback conditioning circuit 31.

With continued reference to FIG. 1, the feedback conditioning circuit 31 may include a signal conditioning circuit 42, a sampling circuit 81 and logic processor 99. The signal conditioning circuit 42 receives the signals generated through the sense leads 55, 58, scales the input signals and segments the signals into separate signal components representing both magnitude and polarity. The signals may then be converted into digital signals by the sampling circuit 81. Thereafter, the digitally converted signals are shifted into a logic processor 99 that derives a feedback signal based upon the magnitude of the input signals and the polarity of the sense leads. Output from the processor may subsequently be communicated to the controller 27 for access to the conditioned feedback signal in combining it with the command signal to adjust the power signal accordingly.

Figure 2:
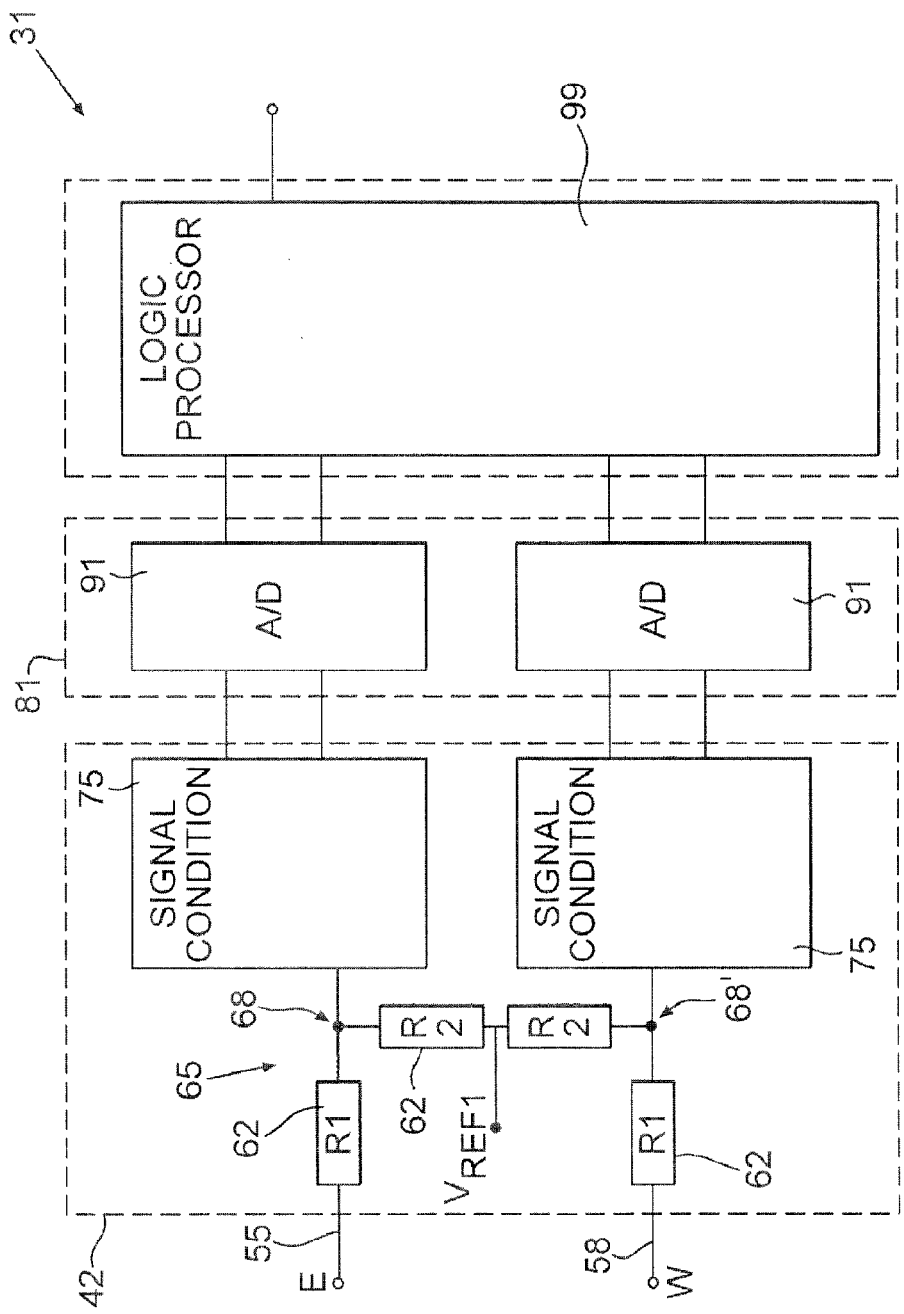
FIG. 2 is a combination block diagram and wiring schematic of the feedback condition circuitry according to the embodiments of the subject invention.

With reference now to FIG. 2, the signal conditioning circuit 42 may include a voltage divider network 65. Input signals detected at the work piece 51 may be directed through the sense leads 55, 58 as previously mentioned, of which the input signals may be analog signals representing one or more electrical parameters of the welding process. For example, a first sense lead signal returned by sense lead 55 may represent the operating voltage at the electrode E. Similarly, a second sense lead signal may represent the operating voltage at the work piece W via sense lead 58. The input signals or signals from the sense leads 55, 58 may be directed to the voltage divider network 65, which may include a network of resistors or other resistive components including passive and/or active devices, for scaling the representative signals. For exemplary purposes the voltage divider network 65 will be described using resistor components 62. However, any means for scaling the input signals may be chosen with sound engineering judgment. The voltage divider network 65 may utilize multiple resistor components 62 connected in series to form the voltage divider network 65. Nodes 68 may be defined as the junction between the resistor components 62. In one branch of the voltage divider network 65, two resistors R1 and R2 may be connected in series between one of the sense leads and a reference voltage $V_{REF1}$. A parallel branch may similarly be connected between the other sense lead and the common reference voltage $V_{REF1}$. It will be appreciated by persons of ordinary skill in the art that scaled input signals may be drawn from the nodes 68 between the resistors R1, R2 respectively. The degree of scaling will naturally depend upon the values of the resistors R1, R2 and the reference voltage $V_{REF1}$. In one embodiment, the resistor value of R1 may be substantially 100 Kilo-Ohms and R2 may be substantially 5 Kilo-Ohms. However, any ratio of resistance values for R1 and R2 may be chosen as is appropriate for scaling the input signals in accordance with the embodiments of the subject invention. It is noted here that each branch of the voltage divider network 65 may scale the signals in the same manner. In other words, the voltage divider network 65 may comprise one or more substantially identical branches with resistors 62 having substantially the same values in the same order with respect to a common reference voltage $V_{REF1}$. As such, similarly scaled input signal values will be present at each of the respective nodes 68, 68' of the parallel branches.

Figure 3:
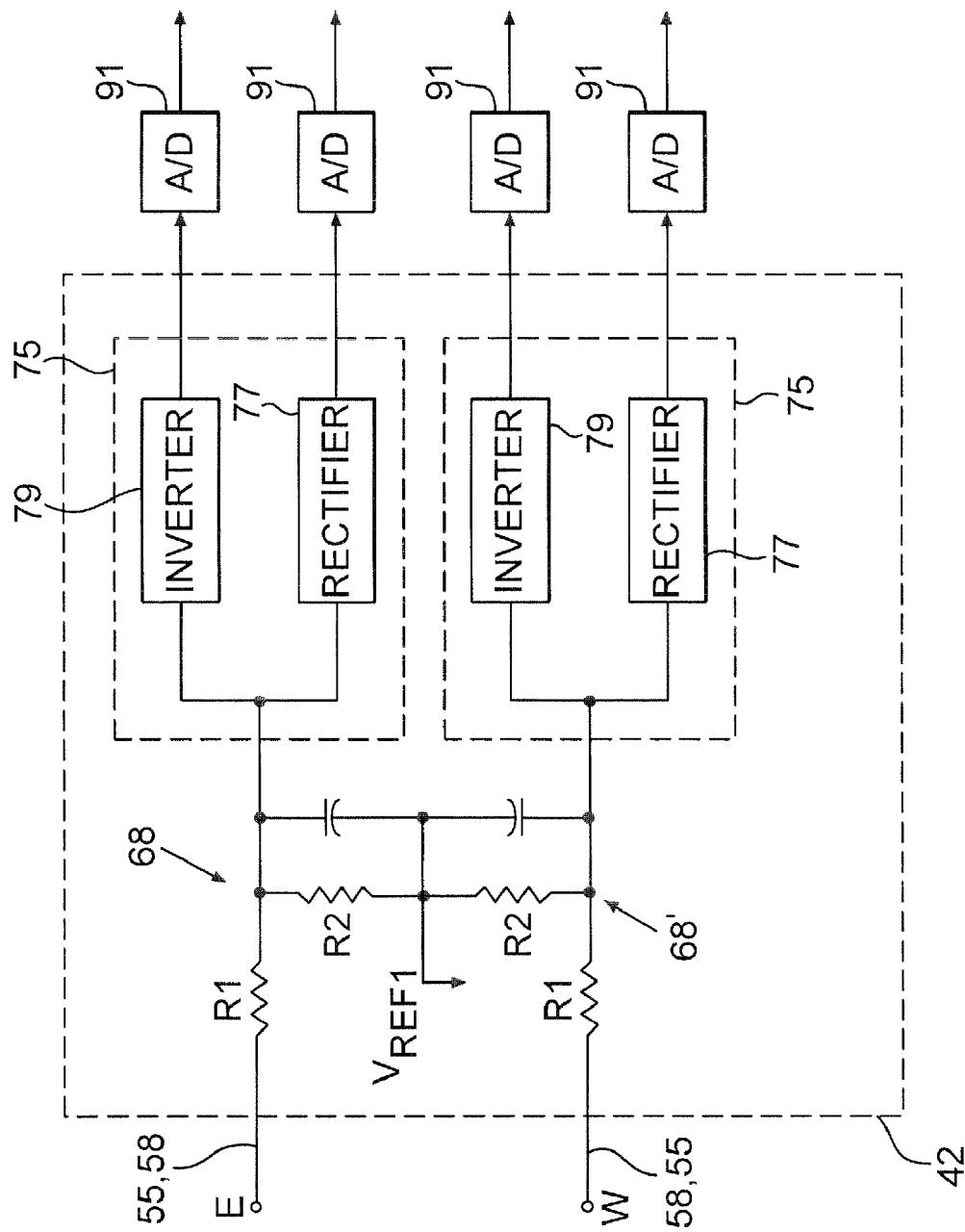
FIG. 3 is a combination block diagram and wiring schematic of the divider network showing the rectifying and inverting circuits according to the embodiments of the subject invention.

With reference now to FIGS. 2 and 3, the signal conditioning circuit 42 may further comprise a plurality of parallel branch rectifying circuits 75 that further condition the intermediate feedback signals as taken from nodes 68, 68'. In one embodiment, each of the parallel branch circuits 75, as shown in dashed lines, may include a rectifying circuit 77 and an inverting rectifying 79 circuit. Input signals scaled by the voltage divider network 65 may be directed into each of the rectifying circuits 77, 79 for detecting the magnitude and the polarity of the sense leads 55, 58. For example, a first signal directed from the electrode E may be scaled by the voltage divider network 65 and subsequently directed into a rectifying circuit 77. The rectifying circuit 77 may be a half-wave rectifier that amplifies only positive components of the signal. In a parallel branch, inverting circuit 79 inverts the signal and rectifies the inverted signal. Similarly, a second input signal directed from the work piece W may be conditioned by a parallel set of inverting and rectifying circuits also segmenting the second input signal into separate components. Therefore the rectifying circuits 77, 79 breakdown the inputs signals received by the sense leads 55, 58 for processing by a logic processor and/or other circuitry to determine the polarity connection of the sense leads 55, 58.

Figure 4:
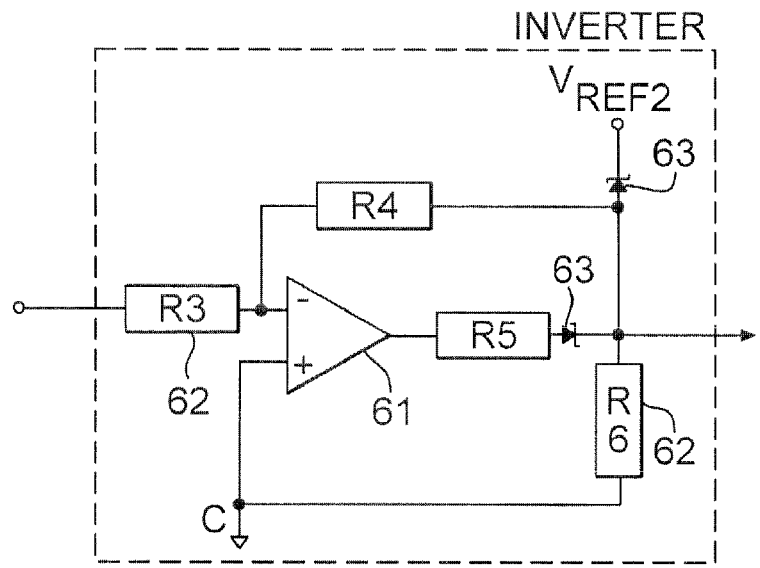
FIG. 4 is a schematic representation of one configuration of an inverting precision rectifier according to the embodiments of the subject invention.
Figure 5:
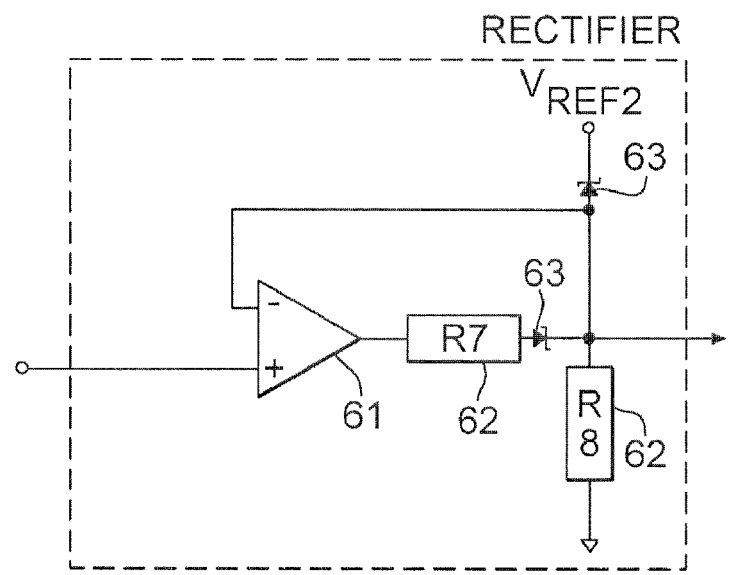
FIG. 5 is a schematic representation of another configuration of a precision rectifier according to the embodiments of the subject invention.

With reference now to FIGS. 4 and 5, in one embodiment the input signals may be rectified and inverted using precision rectifiers. Precision rectifiers may be implemented using an op-amp 61 (operational amplifier) and may include one or more diodes 63 in the feedback loop. This effectively cancels the forward voltage drop of the diode allowing low level signals to still be rectified with minimal error. FIG. 4 depicts one configuration of precision rectifier where the input signal is both rectified and inverted. In this embodiment, the precision rectifier may be a half wave rectifier where the input signal values are inverted. The negative values, up to a particular level, are cropped. FIG. 5 depicts another configuration of precision rectifier that crops negative input signals values within a specific range but amplifies the positive signals. The degree of amplification may depend on the values of the resistor elements R3 through R8, which may be any chosen value as is appropriate for amplifying the intermediate signals according to the embodiments of the subject invention. For example, R3 and R4 may be 100 Kilo-ohms. R5 and R7 may be approximately 100 Ohms. R6 and R8 may be 1.5 Kilo-Ohms. It should be noted that these resistance values are exemplary in nature. As such, any resistor values may be chosen with sound engineering judgment. The rectifying 77 and inverting 79 circuits may be connected in parallel as shown in FIG. 3. This functions to segment the input signals, the use of which will be discussed further with the continued description of the embodiments of the subject invention.

With reference again to FIGS. 1 and 2, the input signals, as detected by the sense leads 55, 58, may be analog signals. The analog input signals are scaled by the voltage divider network 65 and segmented by the rectifying circuits 75. Accordingly, signals output from the signal conditioning circuit 42 may also be analog signals. The intermediate analog signals may subsequently be directed into sampling circuits 81 as shown in FIG. 2 by dashed lines. The sampling circuits 81 may convert the intermediate analog signals into digital signals for subsequent processing by a digital logic processor as will be discussed further in subsequent paragraphs. In one embodiment, the sampling circuit 81 may comprise analog-to-digital converters 91, or A/D converters 91, that sample, hold and convert the intermediate analog signals thereby translating the analog signal values into binary numbers. One example of an A/D converter is the ADS7886 manufactured by Texas Instruments, which samples at a rate of up to 1 MSPS (Mega-Samples-Per-Second). The ADS7886 may convert the analog signal into a 12-bit binary number. The feedback conditioning circuit 31 may include one A/D converter 91 for each segmented intermediate analog signal. As such, each of the segmented values may be digitally converted at substantially the same time. In other words, each of the rectifying and inverting circuits may be electrically communicated to individual corresponding A/D converters 91 thus comprising a plurality parallel branch circuits for simultaneous operation. While the aforementioned sampling circuit 81 is described utilizing a particular commercially available model, it is to be understood that any model of A/D converter or any other circuitry converting analog signals into digital signals may be used without departing from the scope of the embodiments of the subject invention. In other words, any manner of digitally converting the intermediate analog signals may be chosen with sound engineering judgment. Data communication from the A/D converters 91 to the logic processor 99 may be synchronized by a clock signal common to all of the components 91, 99. In one embodiment, the logic processor 99 may include multiple data inputs for receiving data at each of the input channels during the same clock cycle. Thus, conditioned feedback data from the sense leads 55, 58 are received by the logic processor 99 in a synchronized and substantially simultaneous manner.

Figure 6:
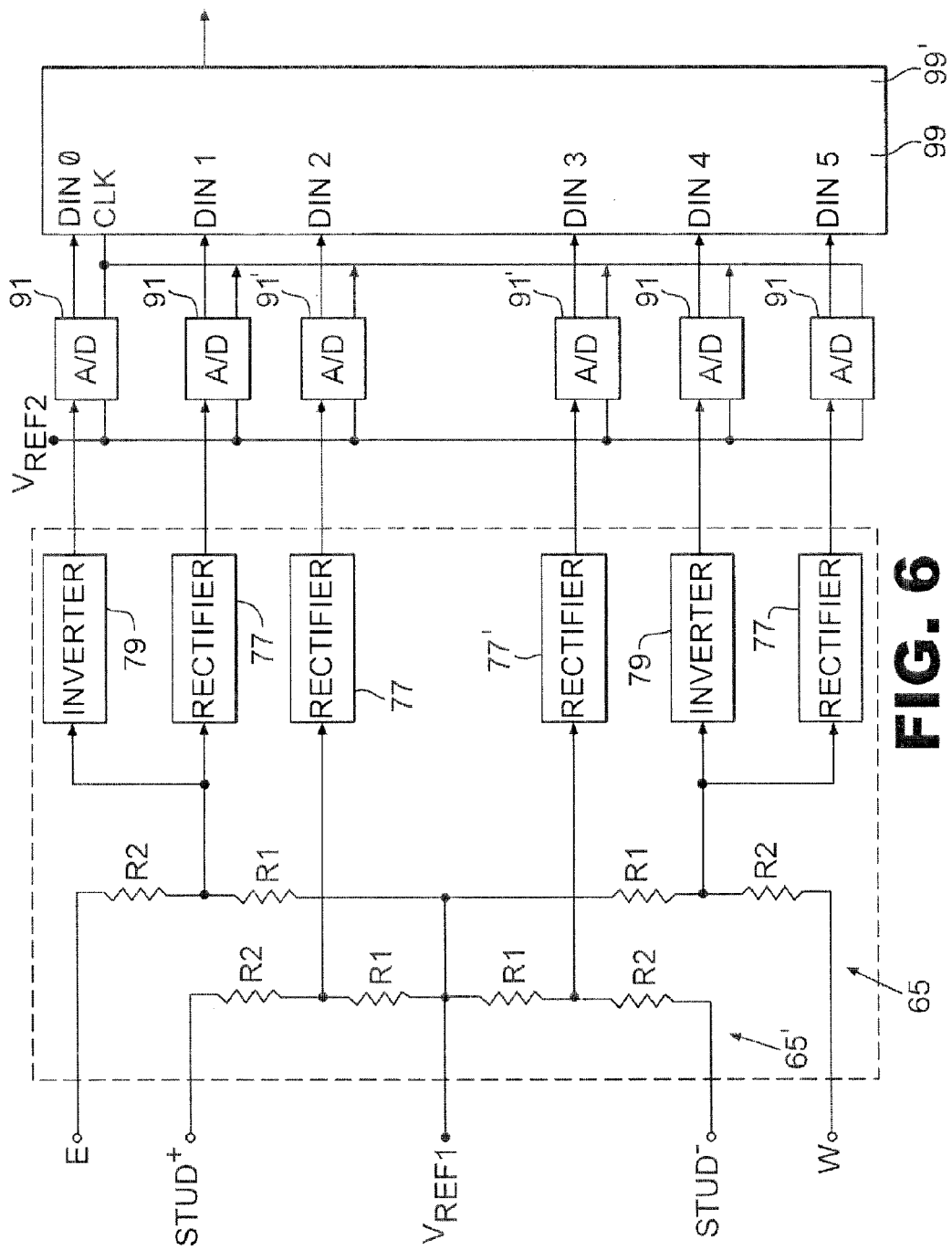
FIG. 6 is a combination block diagram and wiring schematic of the signal conditioning feedback circuit according to the embodiments of the subject invention.

With reference again to FIGS. 1 and 2 and now also to FIG. 6, logic devices or logic processors 99 can be classified into two broad categories: fixed and programmable. Naturally, the circuits in a fixed logic device cannot be changed. On the other hand, programmable logic processors can be changed at any time to perform any number of functions. In one embodiment of the subject invention, the logic processor 99 may comprise a programmable logic processor 99, such as a field-programmable gate array 99' frequently referred to as an FPGA. FPGAs are similar in principle to, but have wider potential application than, programmable read-only memory integrated circuits. An FPGA is a semi-conductor device containing programmable logic components and programmable interconnects that can be programmed to duplicate the functionality of basic logic gates (e.g. AND, OR, XOR, NOT) or even more complex arithmetic functions. The logic processor 99 may combine one or more binary inputs as received from the A/D converters 91 to one or more outputs according to a Boolean logic function in a predetermined manner. Specifically, the processor's logic may be physically implemented as a small look-up table memory, as shown in FIG. 7. However, the processor's logic may alternatively be implemented as a set of multi-plexers and/or gates. It is noted here that while the logic processor 99 is exemplified as an FPGA, it is to be construed that any type of logic devices, either fixed and/or programmable, may be chosen with sound engineering judgment for implementing the logic functions as described herein without departing from the intended scope of the embodiments of the subject invention.

With reference again to FIG. 6, similar to the circuits for conditioning the input signals from the sense leads 55, 58, the feedback conditioning circuit 31 may further include additional circuits for scaling and amplifying signals representing the operating parameters, and more specifically voltage, at the studs 23, 24. These circuits, as shown in FIG. 6, are directed through a voltage divider network 65', rectifying circuits 77' and are digitally converted by corresponding A/D converters 91. The signals are subsequently shifted into the logic processor 99 in a synchronous manner along with the conditioned signals from the sense leads 55, 58. As such, DIN 2 receives data representative of the scaled signal from the positive stud 23 and DIN 3 receives the scaled signal from the negative stud 24. It is noted that the signals from the studs 23, 24 may not be segmented as are the signals from the sense leads 55, 58. That is to say that the signals from the studs 23, 24 may be rectified and/or amplified but may not inverted. Each of these signals may be used in conjunction with the signals from the sense leads 55, 58 to derive an output feedback signal as determined by the logic table shown in FIG. 7.

With reference now to FIGS. 4 through 6, as mentioned above input signals from the sense leads 55, 58 may represent one or more operating parameters, and more specifically voltage, of the welding process at the weld site. Each sense lead returns an input signal that may be segmented and used to determine the polarity of the sense leads 55, 58 and to derive a feedback signal for correcting the power output at the studs 23, 24. Each of the input signals, one representing the electrode E and the other representing the work piece W, may be scaled via the voltage divider network 65 and subsequently directed into parallel precision rectifier circuits that separately rectify and invert the signals thereby deriving at least two separate components of each input signal. The outputs of the rectifying circuits and subsequent digitally converted equivalent may be directed into the logic processor 99, which may perform logic functions on the data thereby deriving the feedback values. It will be readily seen from FIG. 6 that the input DIN 0 of the logic processor 99 corresponds to the inverted signal from the electrode E. Similarly, DIN 1 corresponds to the rectified signal of the electrode E. Likewise, DIN 4 and 5 correspond to the inverted and rectified signals from the work piece respectively. The logic table, as depicted in FIG. 7, shows one relationship for logically processing the input data. Accordingly, the logic processor 99 may calculate an output feedback signal responsive to the values of the conditioned input signals as received by the input channels DIN 0 through DIN 5.

With reference to FIGS. 6 and 7, the signal data received by the digital inputs of the logic processor 99 may be used to populate the logic inputs of the logic table. In one embodiment, the digital input values may be compared to base value or threshold value to determine the connectivity of the sense leads and correspondingly to determine which signal parameters will be used to calculate the feedback signal. Accordingly, for input signals below the threshold value, a zero (0) will be placed in the logic table under the column for the particular input, e.g. DIN0, DIN1. Similarly, for input signal values above the threshold value, a one (1) will be placed in the corresponding column. It is noted that the magnitude of the actual signal values are not changed by comparison to the threshold value. Rather the derived data may be stored internally, or externally, in memory for access by the processor in calculating the feedback signal. It should be noted that since the input signal values may be scaled by the voltage divider network 65, 65', a threshold value may be chosen to coincide with the conditioned input signals values. However, any threshold value may be chosen as is appropriate for use with the embodiments of the subject invention. For example, if the signal at the electrode E is positive, DIN 1 will receive a scaled value proportionate to the magnitude of the signal at the electrode and DIN 0 will have a value of substantially zero. Additionally, if the signal at the work piece W is zero, accordingly DIN 4 and DIN 5 will also be substantially zero. The logic processor 99 may compare the values of the logic processor input, i.e. DIN 0-DIN 5, with respect to the threshold value. The logic inputs may be populated and the logic table then examined to determine which logic function will be used to derive a feedback signal. In the instance where the positive value of DIN 1 meets or exceeds the threshold value, the logic processor 99 may assign a value of one (1) to the logic input corresponding to that digital input of the logic table. The logic processor 99 may therefore calculate the feedback signal value as the difference between the value of DIN1 and DIN3 as prescribed by the logic table. In the instance where the value of the signal received at DIN1 is positive but less than the threshold value, a value of zero (0) will be assigned to the logic table in the DIN 1 column. In this instance, the logic processor 99 may calculate the feedback signal value based on the difference between the values of DIN2 and DIN3. Once the value of the feedback signal has been calculated, it may be stored in a memory unit of the logic processor 99. In one embodiment, the logic processor 99 may be an FPGA 99' and the memory unit may be an internal register accessible by the controller 27. However, any manner of storing and communicating the calculated value of the feedback signal may be chosen with sound engineering judgment.

With reference now to FIG. 8.1 and FIG. 9, another example of the operation of the feedback conditioning circuit 31 will now be described. Welding power output at the studs 23, 24 may range between a positive maximum magnitude and a negative maximum magnitude respectively. FIG. 8.1 shows sense lead 58 connected to the work piece and sense lead 55 connected to the electrode 45. The sense leads 55, 58 may direct input signals through terminals E, W of the feedback conditioning circuit 31 respectively. It will be recognized that DIN0 and DIN1 represent signals generated by sense lead 55 and similarly DIN4 and DIN5 represent signals from sense lead 58. A positive signal value at the electrode E may result in DIN0 equaling substantially zero (0) and DIN1 equaling a value proportional to the electrode E signal magnitude above the threshold value. Additionally, DIN4 may receive a positive value proportional to the work piece W signal magnitude above the threshold value and DIN5 may be substantially zero (0). Based on the logic table value, the feedback signal will be based on the difference between DIN0 and DIN4, which will be readily seen as the scaled values returned by the sense leads 55, 58.

With continued reference to FIG. 8.1 and FIG. 9, the above described example may represent one operating condition of the welder 1 where the sense leads 55, 58 are correctly connected to the power supply 3. However, in the event that one of the sense leads 55, 58 becomes disconnected, the feedback conditioning circuit 31 may automatically adjust for the disconnection. If this example, sense lead 55 may become disconnected from communicating an input signal into the feedback conditioning circuit 31. The signal received at the corresponding logic processor inputs DIN0, DIN1 may be substantially zero and thus the logic table for DIN0 and DIN 1 will correspondingly be zero (0). The feedback conditioning circuit 31 may quickly compensate for the disconnected lead by adjusting the logic function used to calculate the feedback signal. Specifically, the feedback value will now be based on the difference between DIN2 and DIN4, which relates to the scaled values of the positive stud 23 and the inverted sense lead 58. It is noted that the feedback conditioning circuit 31 quickly adjusts for the disconnection via the logic processor. The aforementioned example points out the robustness of the feedback conditioning circuit 31. That is to say that the feedback conditioning circuit 31 may quickly respond to changes in the welder 1. This may be attributed to the substantially simultaneous conditioning of the input signals and synchronized shifting of data into the logic processor 99.

With reference now to FIG. 8.2, the operator of the welder 1 may switch the connection of the sense leads 55, 58, with respect to the configuration shown in FIG. 8.1, without having to configure the power supply 3 and without experiencing adverse affects on the welding process. For this configuration of sense lead connections, the input signal values E, W may be inverted respectively. Accordingly, logic table values for DIN0 may be one (1) and DIN 1 may be zero (0). Additionally, logic table values for DIN4 may be zero (0) and DIN5 may be one (1). The feedback signal will therefore be based on the difference between actual values received at DIN5 and DIN0. Thus, the juxtaposition of the sense leads between the electrode and the work piece may result in an automatic adjustment of the feedback signal.

The logic processor 99, once it has completed the calculation of the feedback signal, may store the value in an internal register as previously mentioned. The controller 27 may be electrically communicated to the logic processor 99 for access to the register. The command signal may therefore be adjusted by combining a previously computed command signal with the new feedback signal as retrieved from the logic processor 99.

The invention has been described herein with reference to the preferred embodiment. Obviously, modifications and alterations will occur to others upon a reading and understanding of this specification. It is intended to include all such modifications and alternations in so far as they come within the scope of the appended claims or the equivalence thereof.

What is claimed is:

1. A feedback control device for generating a feedback signal used to adjust a power output for a welding power supply electrically connected with first and second sense leads coupled respectively to an electrode and a workpiece, the first and second sense leads communicate first and second sense lead signals respectively during a welding operation, the feedback control device comprising:
- a scaling circuit that receives the first and second sense lead signals, and outputs scaled sense lead signals, wherein the scaling circuit includes a voltage divider network comprising a plurality of resistor components connected in series between the first and second sense leads and a reference voltage;
- a pair of rectifier circuits that each accept one of the scaled sense lead signals, outputted from the scaling circuit, that each represent a parameter of a welding process, wherein each rectifier circuit separately rectifies and inverts the respective scaled sense lead signal to create a plurality of rectified outputs representing at least a magnitude component and a polarity component of the respective scaled sense lead signal; and
- a logic processor having at least one input corresponding to each of the plurality of rectified outputs, the logic processor configured to:
  - cycle through a logic function that generates the feedback signal responsive to the plurality of rectified outputs; and
  - communicate the feedback signal to the welding power supply, wherein the power output of the welding power supply is adjusted during the welding operation based on the feedback signal.

2. The feedback control device of claim 1 further comprising:
- a plurality of analog-to-digital converters electrically connected between each of the plurality of rectified outputs and the at least one input of the logic processor respectively.

3. The feedback control device of claim 2, wherein at least one rectifying circuit of the pair of rectifying circuits comprises:
- a precision rectifying circuit having at least a rectified signal output; and
- a precision rectified inverting circuit connected in parallel with the first precision rectified circuit between the voltage divider network and the logic processor.

4. The feedback control device of claim 1, wherein the logic processor is further configured to compare a magnitude of one or more of the plurality of rectified outputs to a threshold value to determine respective polarities of the first and second sense leads.

5. The feedback control device of claim 2, wherein the plurality of analog-to-digital converters, connected in parallel, convert each of the plurality of rectified outputs into a binary number.

6. The feedback control device of claim 5, wherein the binary number is synchronously communicated to the logic processor based on a clock signal.

7. A system for generating a feedback signal used to adjust a welding power output, comprising:
- a welding power supply electrically connected with first and second sense leads coupled respectively to an electrode and a work piece, the first and second sense leads communicate first and second sense lead signals respectively during a welding operation;
- a feedback control device comprising:
  - a scaling circuit having a voltage divider network comprising a plurality of resistor components connected in series between the first and second sense leads and a reference voltage;
  - a pair of rectifier circuits that each accept an analog signal, outputted from the scaling circuit, that represents a parameter of a welding process, wherein each rectifier circuit separately rectifies and inverts the analog signal to create a plurality of rectified outputs representing at least a magnitude component and a polarity component of the analog signal; and
  - a logic processor having at least one input corresponding to each of the plurality of rectified outputs, the logic processor configured to:
    - cycle through a logic function that generates the feedback signal responsive to the plurality of rectified outputs; and
    - communicate the feedback signal to the welding power supply, wherein the power output of the welding power supply is adjusted during the welding operation based on the feedback signal.

8. A feedback control device for generating a feedback signal used to adjust a power output for a welding power supply electrically connected with first and second sense leads that communicate first and second sense lead signals respectively, the feedback control device comprising:
- a scaling circuit that receives the first and second sense lead signals, and outputs scaled sense lead signals, wherein the scaling circuit includes a voltage divider network comprising a plurality of resistor components connected in series between the first and second sense leads and a reference voltage;
- a pair of rectifier circuits that each accept one of the scaled sense lead signals, outputted from the scaling circuit, that each represent a parameter of a welding process, wherein each rectifier circuit separately rectifies and inverts the respective scaled sense lead signal to create a plurality of rectified outputs representing at least a polarity component of the respective scaled sense lead signal; and
- a logic processor having at least one input corresponding to each of the plurality of rectified outputs, the logic processor configured to:
  - generate the feedback signal responsive to the polarity component of the plurality of rectified outputs; and
  - communicate the feedback signal to the welding power supply, wherein the power output of the welding power supply is adjusted based on the feedback signal.

* * * * *